Aug. 13, 1946.  A. F. FREDRICKSEN  2,405,879
CANDY DECORATING APPARATUS
Filed April 21, 1945
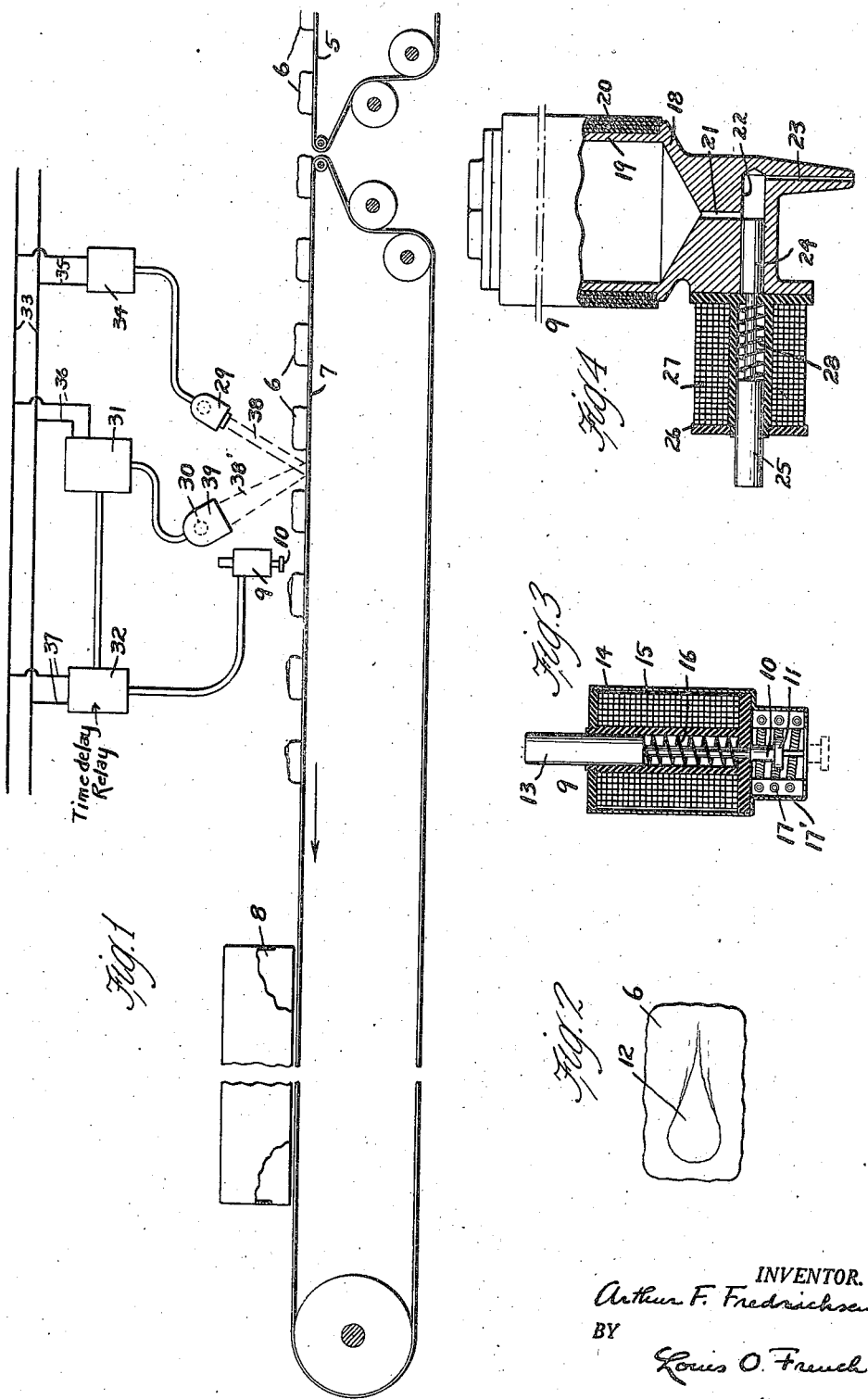
INVENTOR.
Arthur F. Fredricksen
BY
Louis O. French
ATTORNEY.

Patented Aug. 13, 1946

2,405,879

UNITED STATES PATENT OFFICE 2,405,879

CANDY DECORATING APPARATUS

Arthur F. Fredricksen, Milwaukee, Wis.

Application April 21, 1945, Serial No. 589,657

3 Claims. (Cl. 107—1)

The invention relates to an apparatus for decorating candy.

Where the decorating of candy is effected while the candy is traveling along an endless belt, the longitudinal alinement of the individual coated pieces on the belt may be readily effected, but no practical method or means have been devised to space the coated pieces equal distances apart, and yet the design-producing device must operate on each individual piece as it is carried along by the belt. The object of the present invention is to provide an apparatus in which the design-producing device is accurately spotted over each piece of candy and rendered operable while so spotted regardless of differences in spacing of the pieces relative to each other. More particularly according to the present invention, the decorating mechanism is electrically operated and its operation controlled by an electric eye which is operated by a reflected light beam. In the case of chocolate coated candy the belt forms a reflecting surface and the individual coated piece, a darkened surface area, and when this darkened area comes into the path of the light source, the electric eye closes the operating circuit for the decorating mechanism which, because of the spacing of the decorator from the light beam, is operated through a delayed action relay to decorate the coated piece of candy then traveling along directly beneath it. With the present invention designs usually produced by hand stringing and many other designs can be easily produced.

The invention further consists in the several features hereinafter set forth and more particularly defined by claims at the conclusion hereof.

In the drawing:

Fig. 1 is a diagrammatic view of an apparatus embodying the invention, parts being broken away and parts being shown in section;

Fig. 2 is a plan view of a coated piece of candy after decorating;

Fig. 3 is a vertical sectional view of one form of decorator;

Fig. 4 is a vertical sectional view through another form of decorator.

Referring to the drawing, the numeral 5 designates a belt on which the coated pieces of candy 6 are lined up in the direction of travel and carried from the enrober or coating device to an endless belt 7 on which these coated pieces are carried along and past a cooling tunnel 8. The belt 7, in the case of chocolate coated candies, has a glazed white colored supporting surface which acts as a light reflecting surface.

At a suitable point and above the upper run of the belt 7 a decorator or designer 9 is disposed. This decorator may take various forms and in Figs. 3 and 4 I have shown two forms, Fig. 3 showing a decorator that may be used to imitate hand stringing design effects, produced by brushing over or contacting the hot coating of the candy with a stringer member 10, and Fig. 4 a decorator in which the designs are produced by depositing a string of chocolate or other coating on the piece to be decorated. While not specifically shown, it will be understood that these designers may have an independent movement relative to the piece to be decorated so as to produce circular or other forms of design thereon. All of the designers according to this invention are electrically operated, but only when the coated piece to be operated upon is directly beneath them.

Referring to Fig. 3, the stringer member 10 has a round flat head 11 which when brought into contact with the top coating of the piece to be decorated will produce a tear drop design thereon as indicated at 12 in Fig. 2. The upper end of the member 10 is connected to the plunger 13 of a solenoid electromagnet 14 having an energizing coil 15, so that when the solenoid is energized, the member 10 will be moved downwardly into design imparting position, a spring 16 returning the member 10 to an inoperative position. To prevent the member 10 from chilling the coating, its head 11 may be heated by an electrically heated coil 17 surrounding said head in its retracted position and mounted in an enclosing sleeve 17'.

Referring to Fig. 4, the designer includes a receptacle 18 for the design imparting plastic coating such as chocolate whose walls 19 may be heated by electrically heated heating elements 20, said receptacle having an outlet passage 21 communicating with a bore 22 having a restricted outlet 23 through which the coating is forced in a small stream by a plunger 24 working in said bore and operatively connected to and operated by the plunger 25 of a solenoid electromagnet 26, having an energizing coil 27, on its forcing stroke and returned by a spring 28 to a charge receiving position.

For operating the electromagnets 14 or 27 at the desired time I provide an electric eye apparatus including a light source 29, a photo-electric cell or tube 30, a photo-electric relay 31, a time delay relay 32, and a source of electric current including the supply conductors 33.

As shown in Fig. 1, the light source 29 is connected through a transformer 34 and conductors 35 with the supply conductors 33, the relays 31 and 32 similarly connected by the conductors 36 and 37, and said relays 31 and 32 are suitably electrically connected to each other and to the tube 30, so that impulses received by the tube 30 will be transmitted to the relays 32 and 31, so that the relay 32 will close and open the circuit connections for the operating magnets 14 or 27 at a time when the piece to be operated upon is accurately spotted beneath the designer. It will be noted that the beam 38 of light given off by the light source 29 striking the glazed surface of the belt 7 is reflected thereby upwardly as indicated at 38' into the hood 39 in which the photo tube or cell is mounted.

With this arrangement the relay 31 is adjusted so that as long as the light shines on the belt 7, no operating current is transmitted to the designer 9, but as soon as the dark coated candy piece intercepts the light beam 38, the relay 31 is operated, and then after a delay period, determined by the time it takes for the spotted piece to travel from its spotted position to a position beneath the designer 9, the operating current is supplied to operate the electromagnets 14 or 27 and effect the design operation. The elements of the photoelectric eye are not new per se and have, therefore, been only indicated diagrammatically, but their use in the arrangement shown with the time delay relay 32 and for the purpose described is new and produces results equal or superior to hand decorating and with a wider range of design.

I desire it to be understood that this invention is not to be limited to any particular form or arrangement of parts except in so far as such limitations are included in the claims.

What I claim as my invention is:

1. In a candy decorating apparatus, the combination of a belt for carrying coated pieces of candy in longitudinally alined spaced apart condition, the surface of the belt and the coatings having different light reflecting characteristics, a designer for imparting a design on the coated surface of the individual pieces of candy as they move with the belt and including an electrically controlled member, a source of electric current, light responsive means operable through differences of light reflecting characteristics between the coated pieces of candy and the belt, and means operated by said light responsive means for establishing current flow through said electrically controlled member when a coated piece of candy is spotted beneath said designer.

2. In a candy decorating apparatus, the combination of a belt having a light-reflecting surface for carrying pieces of candy having a non-reflecting coating in longitudinally alined spaced apart condition, a designer for imparting a design on the coated surface of the individual pieces of candy as they move with the belt and including an electrically controlled member, a source of current for said electrically controlled member, a light source, an electric eye for controlling said source of current and receiving a beam of light from said light source reflected by said belt and operable to establish current flow when the beam is cut off by the non-reflecting surface of a coated piece as it is carried past said light beam by said belt.

3. In a candy decorating apparatus, the combination of a belt for carrying coated pieces of candy in longitudinally alined spaced apart condition, the surface of the belt and the coatings having different light reflecting characteristics, a designer for imparting a design on the coated surface of the individual pieces of candy as they move with the belt and including an electrically operated member, a solenoid for operating said member, a source of electric current for energizing said solenoid, light responsive means operable through differences of light reflecting characteristics between the coatings for said pieces and the belt, and means including a delayed action relay for establishing current flow through said solenoid when a piece of coated candy is spotted beneath said designer.

ARTHUR F. FREDRICKSEN.